US 6,657,984 B1

(12) United States Patent
Semper

(10) Patent No.: US 6,657,984 B1
(45) Date of Patent: Dec. 2, 2003

(54) SYSTEM AND METHOD PROVIDING BACKWARD COMPATIBILITY OF RADIO LINK PROTOCOLS IN A WIRELESS NETWORK

(75) Inventor: William J. Semper, Richardson, TX (US)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/429,980

(22) Filed: Oct. 29, 1999

(51) Int. Cl.[7] ................................................. H04Q 7/24
(52) U.S. Cl. ....................... 370/338; 370/466; 370/503
(58) Field of Search ................................. 370/338, 349, 370/466, 503, 465, 282, 277; 709/220, 221, 253

(56) References Cited

U.S. PATENT DOCUMENTS

| 6,052,385 A | * | 4/2000 | Kanerva et al. ............. 370/468 |
| 6,072,806 A | * | 6/2000 | Khouri et al. ............... 370/465 |
| 6,088,342 A | * | 7/2000 | Cheng et al. ................ 370/320 |
| 6,118,834 A | * | 9/2000 | Rasanen ..................... 375/372 |
| 6,169,732 B1 | * | 1/2001 | Hetherington et al. ...... 370/335 |
| 6,208,620 B1 | * | 3/2001 | Sen et al. ................... 370/231 |
| 6,330,451 B1 | * | 12/2001 | Sen et al. ................... 455/452 |
| 6,353,620 B1 | * | 3/2002 | Sallberg et al. ............. 370/465 |

* cited by examiner

Primary Examiner—Ajit Patel
Assistant Examiner—Chirag Shah

(57) ABSTRACT

There is disclosed, for use in a wireless network comprising base stations that communicate with mobile stations, a system for controlling the transmission of data in a traffic channel between a base station and a mobile station. The system comprises a radio link protocol (RLP) controller for causing the base station to transmit to the mobile station a first data transfer control message according to a first radio link protocol version, and a timer coupled to the RLP controller for providing the RLP controller an elapsed time after the transmission of the first data transfer control message. The RLP controller, in response to a determination that an acknowledgment message has not been received from the mobile station before the elapsed time has exceeded a maximum value, transmits to the first mobile station a second data transfer control message according to a second radio link protocol version.

21 Claims, 4 Drawing Sheets

SYSTEM AND METHOD PROVIDING BACKWARD COMPATIBILITY OF RADIO LINK PROTOCOLS IN A WIRELESS NETWORK

TECHNICAL FIELD OF THE INVENTION

The present invention is directed, in general, to wireless network and, more specifically, to a system for ensuring backward compatibility in radio link protocol versions.

BACKGROUND OF THE INVENTION

The high level of competition in wireless communication equipment has driven the price of cellular service down to the point where it is affordable to a large segment of the population. Wireless subscribers use a wide variety of wireless devices, including cellular phones, personal communication services (PCS) devices, and wireless modem-equipped personal computer (PCs), among others. The large number of subscribers and the many applications for wireless communications have created a heavy subscriber demand for radio frequency (RF) bandwidth. To meet this demand, wireless service providers have maximized frequency by making individual cell sites smaller and using a greater number of cell sites to cover the same geographical area. Additionally, just as increased modem speeds made widespread use of the Internet possible and more popular, wireless communication protocols and standards are constantly improved in order to increase data bit rates over the wireless link between a wireless communication-device (or mobile station) used by a subscriber and a base station of a wireless network. For example, third generation (3G) wireless devices are expected to transmit data in excess of 140 kilobits per second (kbps) in the forward channel (i.e., from base station to mobile station) and in the reverse channel (i.e., from mobile station to base station).

To support the higher data rates, it is necessary to improve the radio link protocol (RLP) used by base stations and mobile stations to synchronize the transmission of data in the forward and reverse channels. As is well known, base stations and mobile stations communicate in a number of control channels and traffic channels. The control channels, namely pilot, synchronization (sync), paging, and access, are used to register a mobile station with a wireless network and to set up a call in a data traffic channel. The data traffic channels are used to transport subscriber voice and/or data signals.

Within a traffic channel, the radio link protocol (RLP) is used to synchronize the transmission of frames of data in the forward and reverse channels. Previous versions of RLP, such as RLP2 and RLP3 supported data bit rates up to 14.4 Kbps. RLP4 is intended to support much higher bit rates and different frames sizes.

Unfortunately, the control channels of conventional wireless. networks do not provide a mechanism that allows a mobile station and a base station to agree upon a particular RLP version prior to the setup of a traffic channel. This leads to compatibility problems if a base station attempts to transmit traffic data in RLP4 to a base station that only supports RLP1, RLP2 or RLP3.

There is therefore a need in the art for wireless systems that provide backward compatibility between different versions of the radio link protocol in a wireless network. More particularly, there is a need for an improved wireless network base station that is capable of determining the radio link protocol of a mobile station and adjusting the radio link protocol used by the base station to match the radio link protocol of the mobile station.

SUMMARY OF THE INVENTION

To address the above-discussed deficiencies of the prior art, it is a primary object of the present invention to provide, for use in a wireless network comprising a plurality of base stations capable of communicating with a plurality of mobile stations, a system capable of controlling the transmission of data in a traffic channel between a first one of the plurality of base stations and a first one of the mobile stations. In an advantageous embodiment of the present invention, the system comprises: 1) a radio link protocol (RLP) controller capable of causing the first base station to transmit to the first mobile station a first data transfer control message according to a first radio link protocol version; and 2) a timer coupled to the RLP controller capable of providing the RLP controller an elapsed time after the transmission of the first data transfer control message, wherein the RLP controller, in response to a determination that an acknowledgment message has not been received from the mobile station before the elapsed time has exceeded a maximum value, transmits to the first mobile station a second data transfer control message according to a second radio link protocol version.

According to one embodiment of the present invention, the first data transfer control message is a first control frame.

According to another embodiment of the present invention, the control frame comprises a first synchronization (SYNC) frame having a control field set to a SYNC value associated with the first radio link protocol version.

According to still another embodiment of the present invention, the second data transfer control message is a second control frame.

According to yet another embodiment of the present invention, the control frame comprises a second synchronization (SYNC) frame having a control field set to a SYNC value associated with the second radio link protocol version.

According to a further embodiment of the present invention, the maximum value is adjustable.

According to a further embodiment of the present invention, the RLP controller transmits the first data transfer control message to synchronize a transmission of data frames to the mobile station and wherein the RLP controller, upon determining that synchronization has been lost with the mobile station, transmits a different data transfer control message to re-synchronize a transmission of data frames to the mobile station.

According to a further embodiment of the present invention, a sequence number length associated with the different data transfer control message is different than a sequence number length associated with the first data transfer control message.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
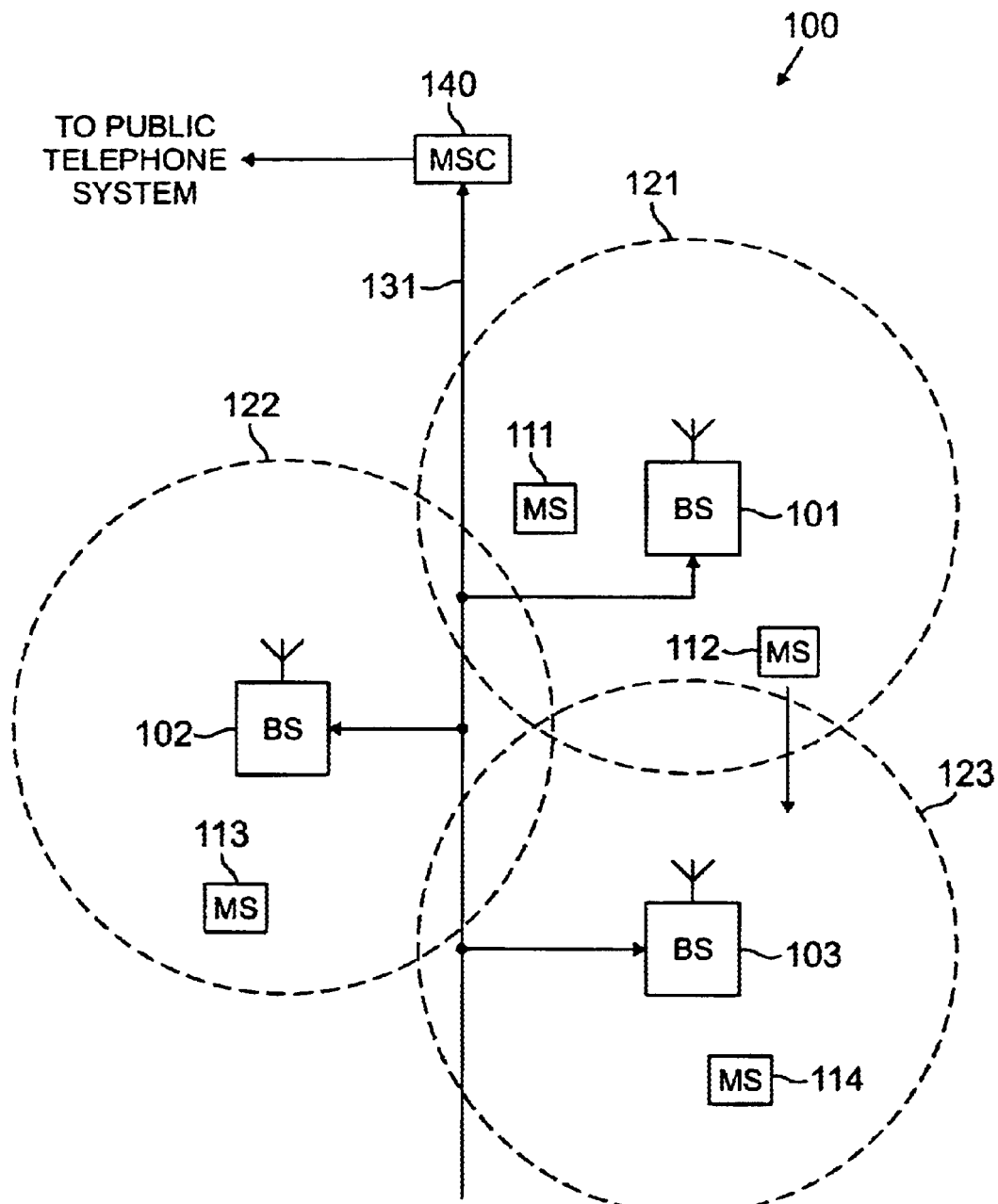
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
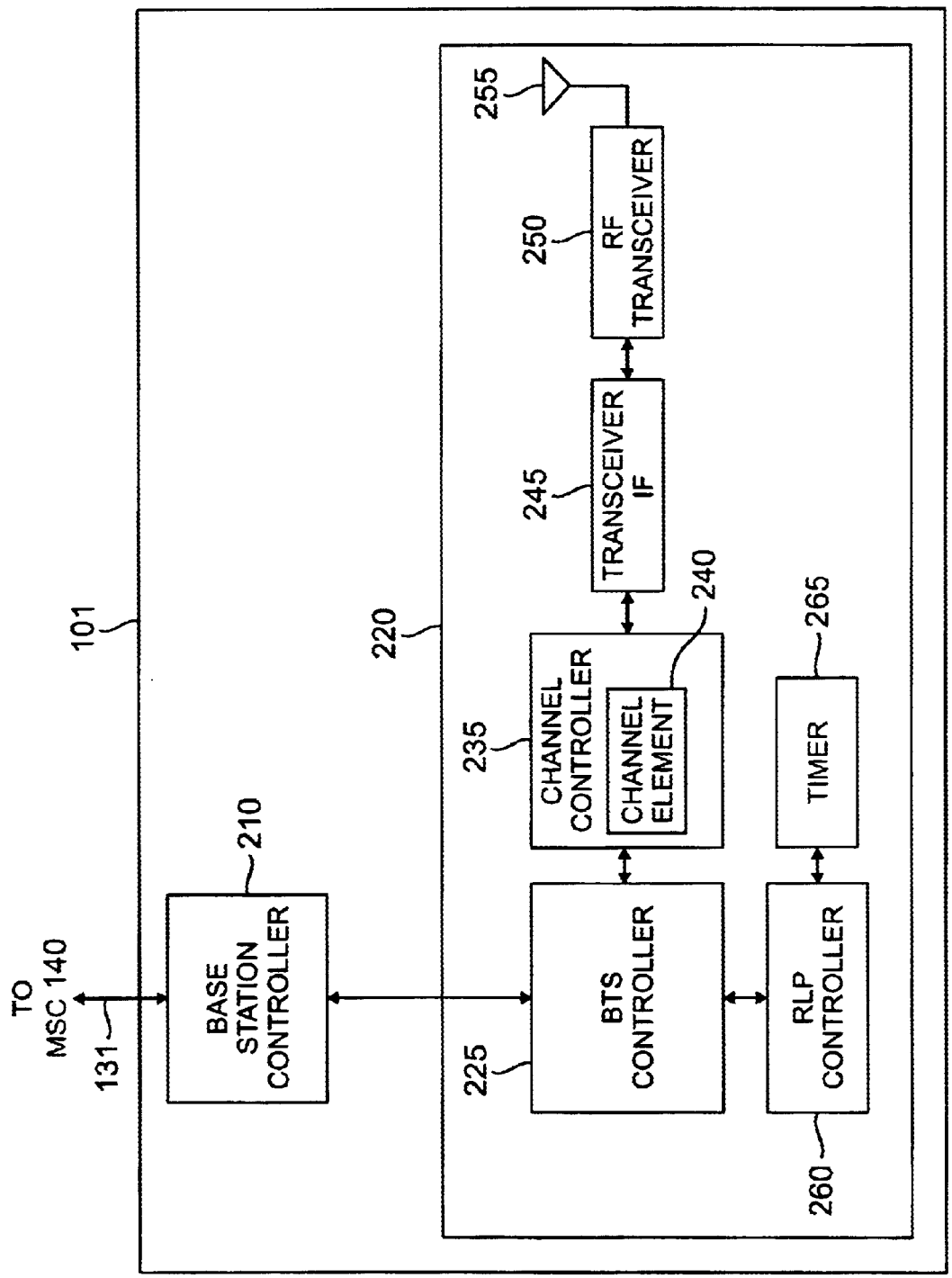
FIG. 2 illustrates in greater detail an exemplary base station according to one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 with representative channel element 240, transceiver interface (IF) 245, RF transceiver unit 250, and antenna array 255. BTS 220 also comprises radio link protocol controller 260 and timer 265, described below in greater detail.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements communicate according to a code division multiple access (CDMA) protocol with the mobile stations in cell site 121. Transceiver IF 245 transfers the bi-directional channel signals between channel controller 235 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Radio link protocol (RLP) controller 260 comprises circuitry that monitors and controls the radio link protocol version that is used by BTS controller 225 to synchronize signals transmitted between BS 101 and the mobile stations, including MS 112. RLP controller 260 determines when the RLP version used by a particular mobile station is not compatible with the RLP version used by BS 101 and provides backward compatibility with prior RLPs, minimizing the obsolescence of mobile stations. This is described in greater detail below.

Timer 265 counts the elapsed time between the time RLP controller 260 causes BS 101 to output a synchronization (SYNC) frame and the time BS 101 receives a mobile station response to the SYNC frame. Timer 265 counts up to an adjustable timeout value (T), which represents the maximum time that BS 101 waits for a mobile station response to a SYNC frame transmitted by BS 101.

In an exemplary embodiment of the present invention, RLP controller 260 uses a 6-bit RLP control (CTL) field in each frame to specify which type of message (frame) is being transferred. In one embodiment of the present invention, RLP controller 260 uses the RLP CTL field in conjunction with timeout T to determine RLP compatibility with a mobile station, such as MS 112. In RLP version 1 (RLP1), RLP version 2 (RLP2), and RLP version 3 (RLP3), the control frames begin with an 8-bit sequence number, followed by a 6-bit CTL field. In RLP1, RLP2 and RLP3, the sequence number is not used for SYNC, ACK, or SYNC/ACK. The sequence number is used only for the negative-acknowledgment (NAK) messages.

The CTL field values for RLP1 are shown in Table 1 below.

TABLE 1

| CTL | Message |
|---|---|
| 1100 00 | NAK |
| 1101 00 | SYNC |
| 1110 00 | ACK |
| 1111 00 | SYNC/ACK |

The CTL field values for RLP2 and RLP3 are shown in Table 2 below.

TABLE 2

| CTL | Message |
|---|---|
| 1100 00 | NAK |
| 1101 10 | SYNC |
| 1110 10 | ACK |
| 1111 10 | SYNC/ACK |

The CTL field values for RLP4 are shown in Table 3 below.

TABLE 3

| CTL | Message |
|---|---|
| 1100 00 | NAK |
| 1101 01 | SYNC |
| 1110 01 | ACK |
| 1111 01 | SYNC/ACK |

RLP controller 260 uses the CTL field of the SYNC, ACK, and SYNC/ACK RLP messages to identify which version of RLP is being use by MS 112. The sequence number size for these messages is 8-bits, so that present and anticipated versions of RLP can recognize the frame. (For the NAK control frame, the sequence number size may depend on which version of RLP is used (e.g. 8-bits for RLP2 and RLP3). Using these control field values and an 8-bit sequence number, RLP controller 260 provides backward compatibility with various versions of RLP, as shown below.

In an exemplary embodiment of the present invention, RLP controller 260 supports communication in a traffic channel using advanced versions of RLP, such as RLP4, and maintains backward compatibility with one or more prior version of RLP, such as RLP2 and RLP3, for example. RLP controller 260 first attempts to synchronize with a mobile station, MS 112 for instance, by transmitting synchronization signals using RLP4 SYNC CTL fields to MS 112, which uses RLP3 or RLP2.

MS 112 ignores the synchronization attempt since it does not recognize RLP4 SYNC. RLP controller 260 subsequently receives a time-out signal from timer 265 which indicates that the time-out T for receiving an RLP4 acknowledgment (ACK) response from MS 112 has been reached. After RLP controller 260 receives the time-out signal, RLP controller 260 causes BS 101 to transmit a SYNC frame in RLP2/3 format to MS 112 to see if MS 112 is able to communicate in RLP2/3.

MS 112 recognizes the RLP2/3 SYNC and responds to BS 101 with an RLP2/3 synchronization/acknowledgment (SYNC/ACK) message. RLP controller 260 recognizes the incoming RLP2/3 SYNC/ACK as an indication that MS 112 is able to communicate with RLP2/3 protocol and causes BS 101 to respond to MS 112 with an RLP acknowledgment (ACK) message. RLP controller 260 enables an RLP2/3 8-bit over-the-air (OTA) sequence number for on-going communications with MS 112. In turn, MS 112 receives the RLP2/3 ACK from BS 101 and establishes RLP2/3 with the 8-bit OTA sequence number for the remainder of the RLP communication session with BS 101. If synchronization is lost during communications between BS 101 and MS 112 for the above example, RLP controller 260 may re-synchronize communications with MS 112 using SYNC, SYNC/ACK, ACK messages as is typically done for RLP2/3 sessions.

However, if RLP controller 260 receives an RLP 4 SYNC/ACK from MS 112 in response to a BS 101 RLP4 SYNC frame, RLP controller 260 determines that MS 112 is compatible with RLP4 and thereafter transmits RLP4 messages to establish an RLP4-RLP4 communication session with MS 112. In these cases, RLP controller 260 enables an OTA sequence number with a new length defined for RLP4. If synchronization is lost during an established RLP4-RLP4 session, RLP controller 260 enables new RESYNC, RESYNC/REACK, and REACK messages for RLP4. The RLP4 SYNC, SYNC ACK, and ACK messages cannot be used for this purpose since those messages may have a different sequence number length (8-bits) with respect to the RLP4 OTA new sequence number length. RLP controller 260 causes BS 101 to transfer the RLP4 RESYNC message with CTL codes as previously described in Table 3 and the new RLP4 sequence number length for ongoing RLP4 sessions. In a similar manner, MS 112 sends a RESYNC/REACK, and BS 101 replies with a REACK, similar to previous versions of RLP but with the RLP4 sequence number length. This is described in greater detail below.

Figure 3:
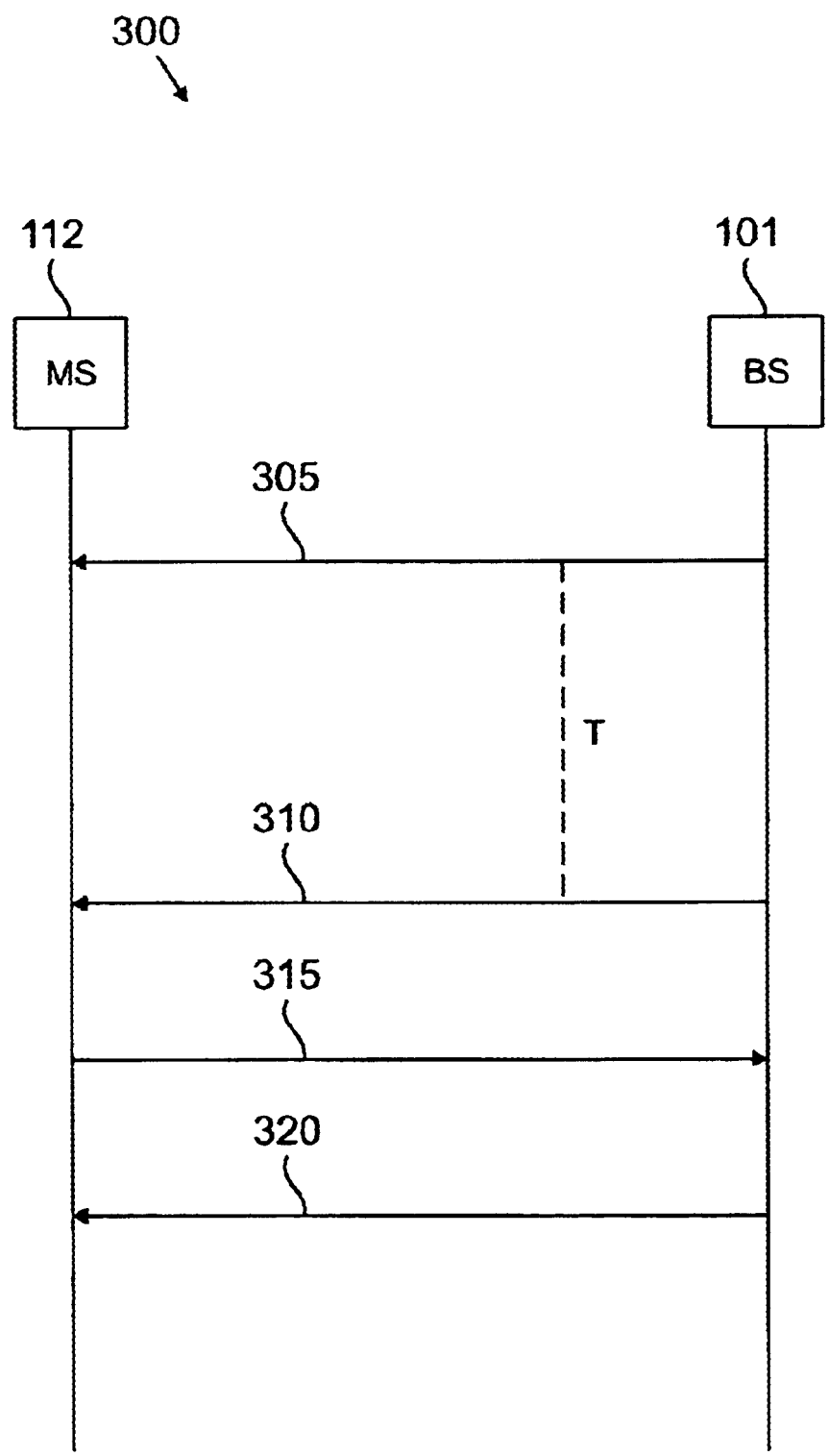
FIG. 3 is a message flow diagram illustrating a synchronization operation in a traffic channel between a base station using a first radio link protocol and a mobile station using a second radio link protocol according to one embodiment of the present invention.

FIG. 3 depicts message flow diagram 300, which illustrates a synchronization operation in a traffic channel between base station 101 using a first radio link protocol and mobile station 112 using a second radio link protocol according to one embodiment of the present invention. For this example, BS 101 is RLP4 compatible and MS 112 is RLP3 compatible. At the beginning of the process, BS 101 sends an RLP4 compatible SYNC frame with CTL data field "1101 01" to MS 112 (message 305). MS 112 does not recognize or respond to the RLP4 SYNC frame.

BS 101 waits an elapsed time T for the return of an RLP4 SYNC/ACK from MS 112. When time T has expired without the return of an RLP4 SYNC/ACK from MS 112, BS 101 determines that MS 112 does not communicate according to RLP4. BS 101 then sends an RLP2/3 SYNC frame with CTL data field "1101 10" (message 310).

MS 112 recognizes the RLP2/3 SYNC frame as valid and responds with RLP2/3 SYNC/ACK CTL data field "1111 10" (message 315). When BS 101 receives the RLP2/3 SYNC/ACK from MS 112, BS 101 determines that MS 112 communicates according to RLP2/3 and responds to MS 112 by sending the RLP2/3 ACK message with CTL field "1110 10" (message 320). BS 101 then continues to communicate with MS 112 using RLP3 with the required 8-bit OTA sequence number.

Figure 4:
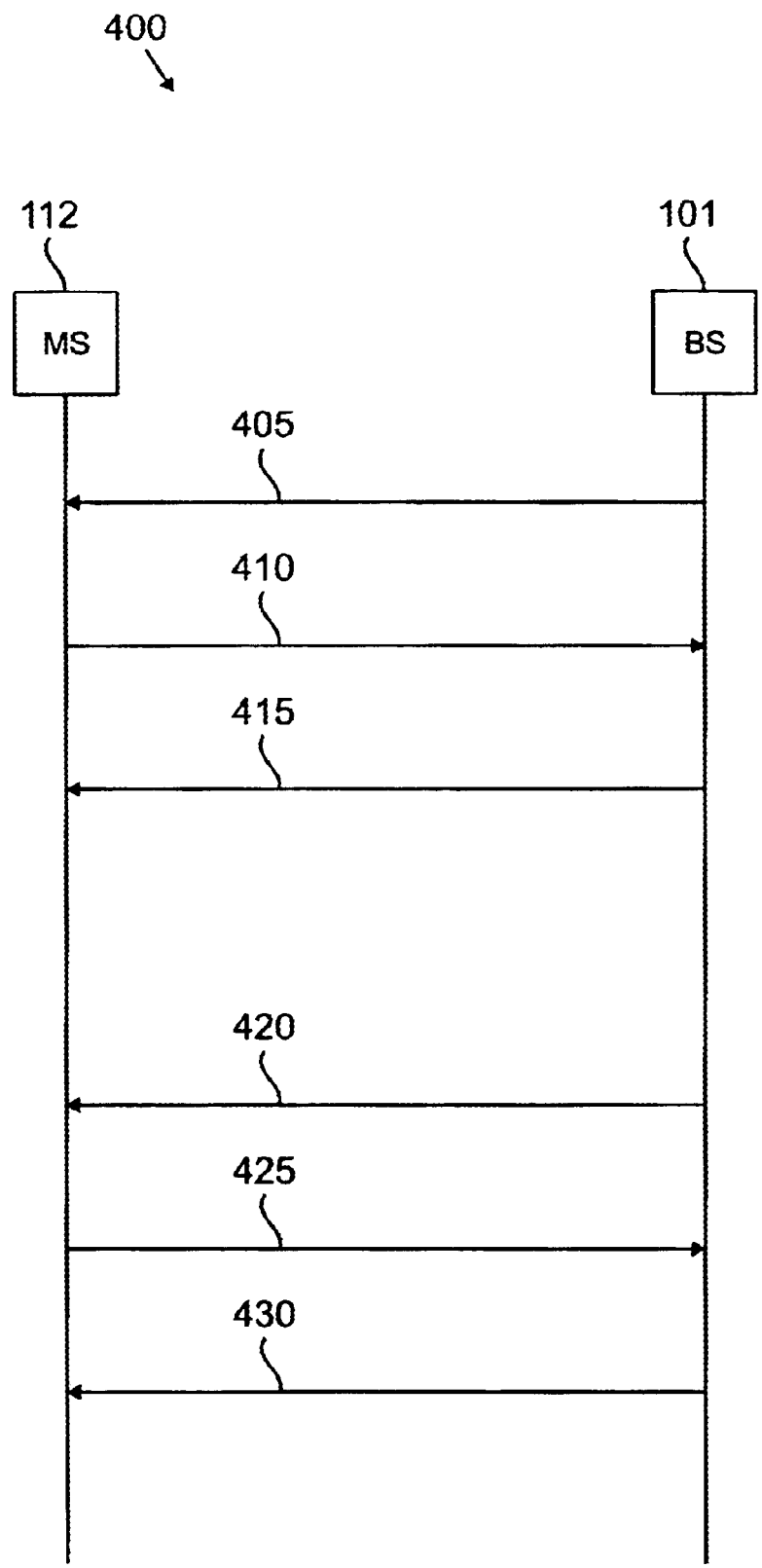
FIG. 4 is a message flow diagram illustrating a re-synchronization operation in a traffic channel between a base station and a mobile station using the same radio link protocol according to one embodiment of the present invention.

In order to support the variable number of frames in transmissions between BS 101 and MS 112 under RLP4, the present invention also introduces new radio link protocol messages that may be used to re-synchronize BS 101 and MS 112 if synchronization errors occur during the transmission of data. FIG. 4 depicts message flow diagram 400, which illustrates a re-synchronization operation in a traffic channel between base station 101 and mobile station 112 using the same radio link protocol according to one embodiment of the present invention. For illustration purposes, exemplary BS 101 and MS 112 are both compatible with RLP4.

BS 101 initiates the communication sequence with MS 112 by sending an RLP4 compatible SYNC frame with CTL data field "1101 01" n (message 405). MS 112 recognizes the RLP4 SYNC frame and responds with an RLP4 SYNC/ACK frame with CTL data field "1111 01" (message 410). BS 101 receives the RLP4 compatible SYNC/ACK from MS 112 and determines that MS 112 is compatible with RLP4. BS 101 subsequently responds with RLP4 ACK with CTL data field "1110 01" (message 415) BS 101 continues to communicate using RLP4 with the new RLP4 OTA sequence number length. MS 112 receives the RLP4 ACK from BS 101 and continue communicating with BS 101 using the new RLP4 OTA sequence number length.

After a period of time, BS 101 determines that synchronization between BS 101 and MS 112 has been lost. BS 101 sends an RLP4 RESYNC frame with CTL data field "1101 01" with the new RLP4 OTA sequence number length (message 420). MS 112 recognizes RESYNC frame from BS 101 and responds with RLP4 RESYNC/REACK frame with CTL "1111 01", using the new RLP4 OTA sequence number length (message 425).

BS 101 receives the RLP4 RESYNC/REACK frame from MS 112 and responds with an RLP4 REACK frame with CTL "1110 01" and the new RLP4 sequence number length (message 430). At this point, BS 101 and MS 112 are re-synchronized and the RLP4-RLP4 communications session continues until synchronization is again lost or the call is terminated.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations capable of communicating with a plurality of mobile stations, a system capable of controlling the transmission of data in a traffic channel between a first one of said plurality of base stations and a first one of said mobile stations, said system comprising:

a radio link protocol (RLP) controller capable of causing said first base station to transmit to said first mobile station a first data transfer control message according to a first radio link protocol version; and a timer coupled to said RLP controller capable of providing said RLP controller an elapsed time after said transmission of said first data transfer control message, wherein said RLP controller, in response to a determination that an acknowledgment message has not been received from said first mobile station before said elapsed time has exceeded a maximum value, transmits to said first mobile station a second data transfer control message according to a second radio link protocol version.

2. The system set forth in claim 1 wherein said first data transfer control message is a first control frame.

3. The system set forth in claim 2 wherein said first control frame comprises a first synchronization (SYNC)

frame having a control field set to a SYNC value associated with said first radio link protocol version.

4. The system set forth in claim 3 wherein said second data transfer control message is a second control frame.

5. The system set forth in claim 4 wherein said second control frame comprises a second synchronization (SYNC) frame having a control field set to a SYNC value associated with said second radio link protocol version.

6. The system set forth in claim 1 wherein said maximum value is adjustable.

7. The system set forth in claim 1 wherein said RLP controller transmits said first data transfer control message to synchronize a transmission of data frames to said first mobile station and wherein said RLP controller, upon determining that synchronization has been lost with said first mobile station, transmits a different data transfer control message to re-synchronize a transmission of data frames to said first mobile station.

8. The system set forth in claim 1 wherein a sequence number length associated with said different data transfer control message is different than a sequence number length associated with said first data transfer control message.

9. A wireless network comprising:
a plurality of base stations capable of communicating with a plurality of mobile stations, at least one of said plurality of base stations comprising:
a system capable of controlling the transmission of data in a traffic channel between a first one of said plurality of base stations and a first one of said mobile stations, said system comprising:
a radio link protocol (RLP) controller capable of causing said first base station to transmit to said first mobile station a first data transfer control message according to a first radio link protocol version; and
a timer coupled to said RLP controller capable of providing said RLP controller an elapsed time after said transmission of said first data transfer control message, wherein said RLP controller, in response to a determination that an acknowledgment message has not been received from said first mobile station before said elapsed time has exceeded a maximum value, transmits to said first mobile station a second data transfer control message according to a second radio link protocol version.

10. The wireless network set forth in claim 9 wherein said first data transfer control message is a first control frame.

11. The wireless network set forth in claim 10 wherein said first control frame comprises a first synchronization (SYNC) frame having a control field set to a SYNC value associated with said first radio link protocol version.

12. The wireless network set forth in claim 11 wherein said second data transfer control message is a second control frame.

13. The wireless network set forth in claim 12 wherein said second control frame comprises a second synchronization (SYNC) frame having a control field set to a SYNC value associated with said second radio link protocol version.

14. The wireless network set forth in claim 9 wherein said maximum value is adjustable.

15. The wireless network set forth in claim 9 wherein said RLP controller transmits said first data transfer control message to synchronize a transmission of data frames to said first mobile station and wherein said RLP controller, upon determining that synchronization has been lost with said first mobile station, transmits a different data transfer control message to re-synchronize a transmission of data frames to said first mobile station.

16. The wireless network set forth in claim 9 wherein a sequence number length associated with said different data transfer control message is different than a sequence number length associated with said first data transfer control message.

17. For use in a wireless network comprising a plurality of base stations capable of communicating with a plurality of mobile stations, a method of controlling the transmission of data in a traffic channel between a first one of the plurality of base stations and a first one of the mobile stations, the method comprising the steps of:
transmitting from the first base station to the first mobile station a first data transfer control message according to a first radio link protocol version; and
waiting a predetermined maximum time period from the transmission of the first data transfer control message for the receipt of an acknowledgment message; and
in response to a determination that an acknowledgment message has not been received from the first mobile station before the predetermined maximum time period has elapsed, transmitting to the first mobile station a second data transfer control message according to a second radio link protocol version.

18. The method set forth in claim 17 wherein the first data transfer control message is a first control frame.

19. The method set forth in claim 18 wherein the control frame comprises a first synchronization (SYNC) frame having a control field set to a SYNC value associated with the first radio link protocol version.

20. The method set forth in claim 19 wherein the second data transfer control message is a second control frame.

21. The method set forth in claim 19 wherein said second control frame comprises a second synchronization (SYNC) frame having a control field set to a SYNC value associated with the second radio link protocol version.

* * * * *

UNITED STATES PATENT AND TRADEMARK OFFICE
CERTIFICATE OF CORRECTION

PATENT NO.   : 6,657,984 B1
DATED        : December 2, 2003
INVENTOR(S)  : William J. Semper It is certified that error appears in the above-identified patent and that said Letters Patent is hereby corrected as shown below:

Column 1,
Line 56, delete "." after "less".

Column 6,
Line 41, delete "use" and replace with -- used --.

Column 7,
Line 6, delete "-" after "with".

Column 8,
Line 12, delete "n" before "message".

Column 9,
Line 50, delete "claim 19" and replace with -- claim 20 --.

Signed and Sealed this

Seventh Day of February, 2006

JON W. DUDAS
*Director of the United States Patent and Trademark Office*